Patented Sept. 2, 1952

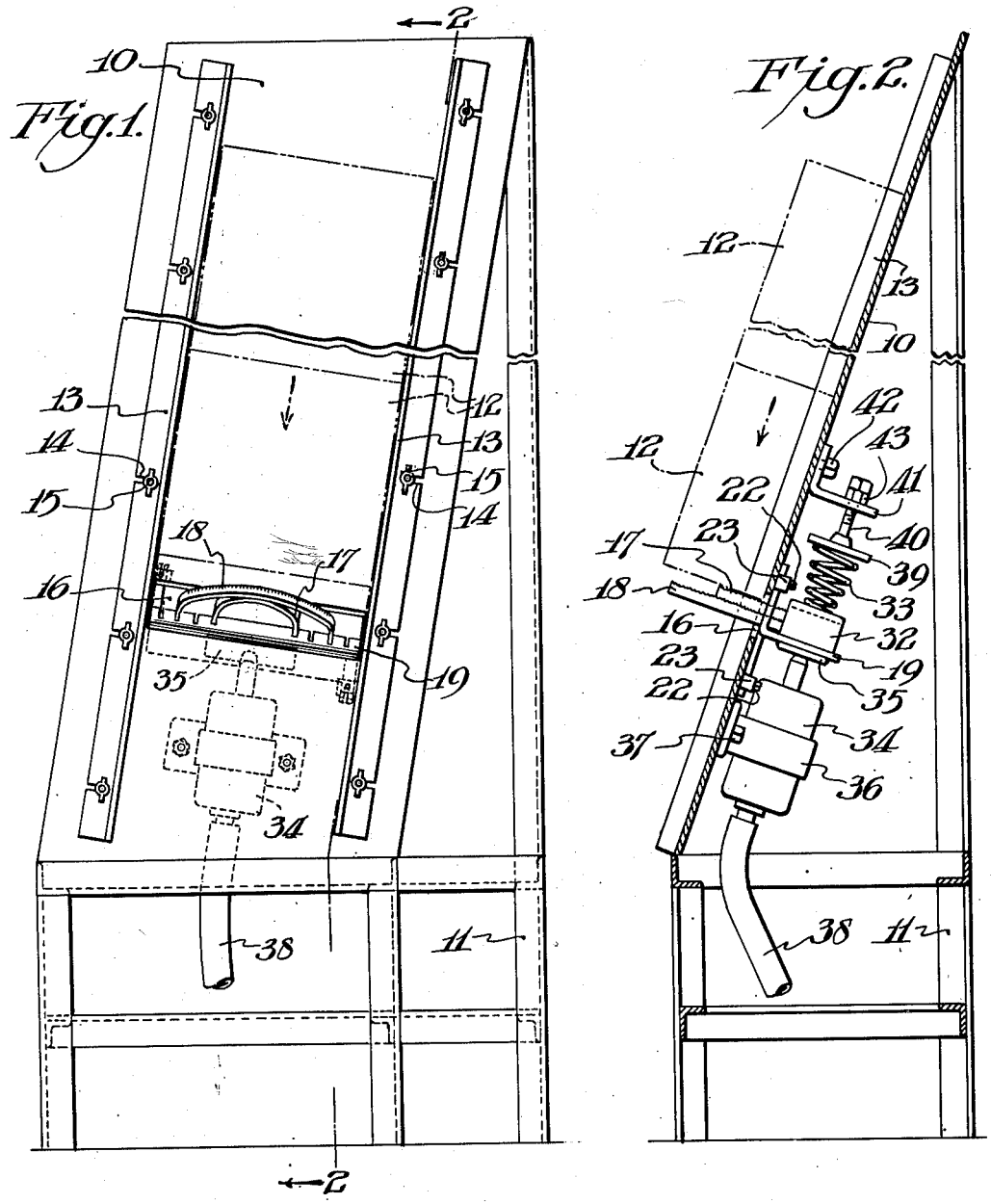

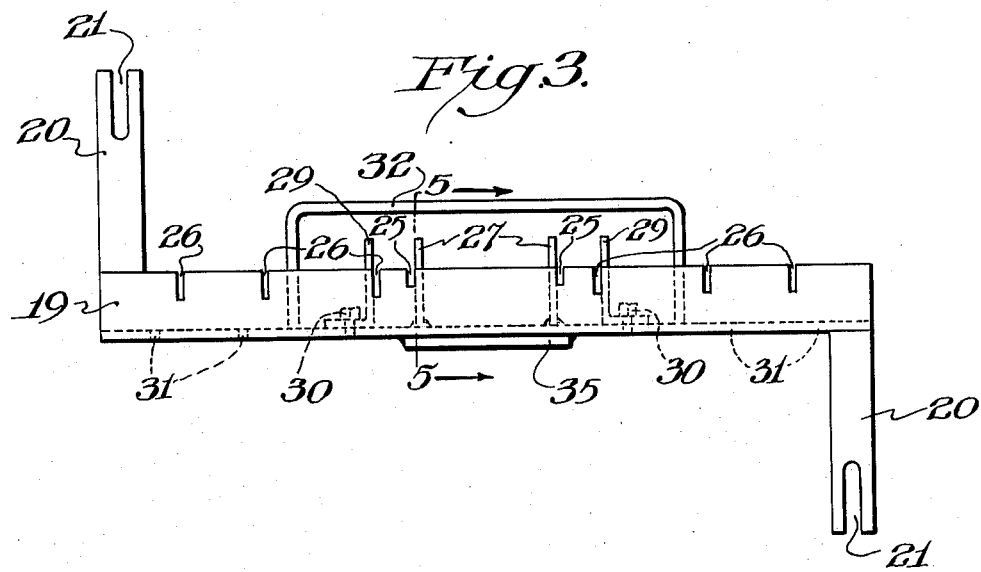
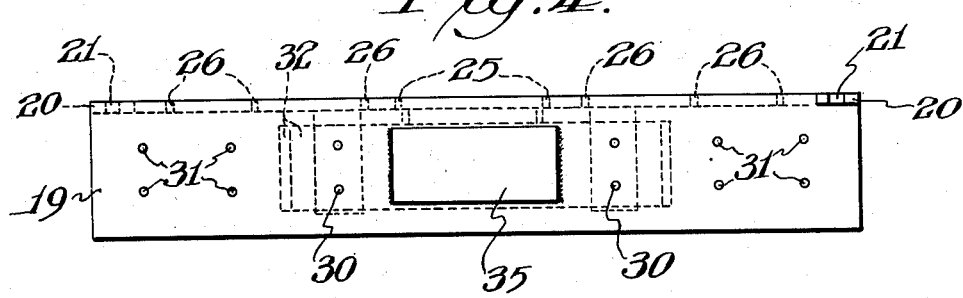
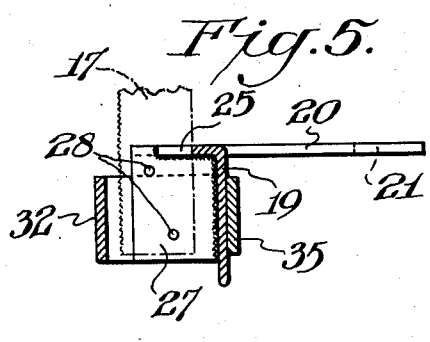
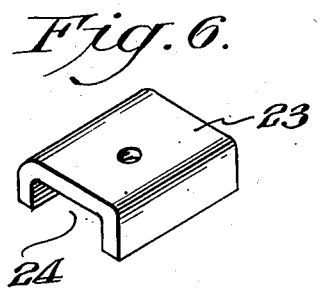

2,609,048

UNITED STATES PATENT OFFICE 2,609,048

SHAPING DEVICE

Walter A. Samans, Philadelphia, Pa., and William B. Weaver, Blooming Rose, W. Va., assignors to E. I. du Pont de Nemours & Company, Wilmington, Del., a corporation of Delaware Application April 5, 1950, Serial No. 154,086

7 Claims. (Cl. 164—48)

This invention relates to improvements in shaping devices, and particularly to shaping devices for forming expanded vitreous masses into predetermined configurations.

Expanded vitreous material has come into extensive use for heat insulation purposes in recent years because of its low unit weight, high moisture impenetrability and low coefficient of heat transmission. One such material, sold under the trade name "Foamglas," consists of a unitary mass of glass which is expanded to a cellular, low density state by releasing gas into the melt and then cooling it to solidification, so that the resulting structure is a porous glass continuum interspersed throughout with a myriad of hermetically sealed gas pockets. This product is customarily marketed in the form of rectangular blocks, if the purchaser himself chooses to shape the insulation to conform to the equipment which he desires to protect or preserve, or the manufacturer may cut the material to order in each specific case. The product is friable in nature and may be accurately cut to a variety of complicated shapes by conventional cutting devices, such as circular saws, band saws or the like. However, because of the highly abrasive nature of the particles, the cutting elements are worn away quite rapidly so that frequent replacement is necessary. A further disadvantage is that high standards of accuracy in the shaping are obtainable with conventional cutters only at relatively low feed rates.

A principal object of this invention is to provide an improved apparatus for shaping expanded vitreous material wherein the action is such that the cutting elements have a greatly increased life as compared with past practice.

Another object of this invention is to provide an improved apparatus for shaping expanded vitreous material which is capable of a high rate of production without sacrificing accuracy.

Another object of this invention is to provide an improved apparatus for shaping expanded vitreous material which eliminates hazards to the operator and accomplishes its purpose without disseminating cuttings into the atmosphere.

Other objects of this invention will become apparent from the detailed description when read in conjunction with the accompanying drawings in which:

Figure 1 is a front elevation of one embodiment of this invention wherein the shaping is effected by a single two bladed assembly having a reciprocatory action;

Figure 2 is a sectional view taken along line 2—2 of Figure 1;

Figure 3 is a plan view of a cutting blade holder;

Figure 4 is a front elevation of the cutting blade holder of Figure 3;

Figure 5 is a sectional view taken along line 5—5 of Figure 3;

Figure 6 is a perspective view of a retaining clamp for the cutting blade holder.

In general, the objects of this invention are accomplished by providing a device wherein the cutting blades are reciprocated alternately toward and away from the mass of vitreous material to be shaped, so that full advantage is taken of the friable properties of the material, while wearing of the blades is greatly reduced.

Referring to Figures 1 and 2, the material feeding table 10 preferably comprises a stiff metal plate having a thickness of the order of about ⅝" which is supported on a welded or bolted angle iron frame indicated generally at 11. In accordance with the practice of this invention, table 10 may be disposed in a horizontal plane or at any inclination to the horizontal. Where the material processed is to be fed through the device by gravity, however, it is preferred to mount the table at an angle of about 70 degrees from the horizontal. We have found that the guiding of successive blocks past the cutting mechanism is facilitated if table 10 is canted approximately 10 degrees from the vertical as indicated in Figure 1, so that the blocks, two of which are indicated in broken outline at 12, will bear against the lowermost of the guiding angles hereinafter described and thereby resist any deviation from the line of feed due to the action of the cutting blades. The length of table 10 should be sufficient to accommodate enough material above the cutting mechanism so that the weight of the load will be sufficient to oppose the reciprocation of the cutting elements, and to enable the material to feed downward by gravity. When rectangular blocks 12" wide x 4" thick x 18" long are shaped by cutting through the 12" x 4" face, we have found that a loading space above the cutting mechanism long enough to receive two or more blocks in end to end relationship at any one time, or about 60", has been ample to achieve gravity feeding.

Table 10 is drilled to receive bolts for the retention of guiding angles 13 which are slotted at points 14 on the sides abutting the table to permit lateral adjustment of these members, the angles being locked in desired position by butterfly nuts 15. The central portion of table 10 is cut away at 16 to provide an opening for the cutting blades 17 and 18 which are mounted on holder 19 secured to the underside of the table by bolts 22.

Holder 19, detailed in Figures 3, 4 and 5, may conveniently comprise a short length of angle iron provided at opposite ends with support straps 20 welded or otherwise securely fastened thereto. The outer ends of straps 20 are slotted at 21 for the reception of bolts 22 which engage with blind tapped holes in the underside of table 10. Holder 19 is assembled on table 10 with sufficient clearance therebetween to permit free reciprocation of the holder in a direction parallel to the longitudinal axis of 10 by interposing channel iron clamps 23 between bolts 22 and table 10, the channel passages 24 in the clamps being slightly larger than the width or thickness of straps 20. Holder 19 is preferably mounted with the same angle of cant as table 10, so that the line of reciprocation of its cutting blades is parallel to the longitudinal axis of 10.

Cutting blades 17 and 18 may comprise relatively thin serrated metal strips, such as hacksaw blades, which are mounted on holder 19 with their serrated edges oriented upwards and in opposition to the direction in which material is fed through the machine. The cutting blades are bent to the profile which is desired in the shaped product, blade 17 effecting the inside cut while blade 18 forms the outside. Where it is desired to shape half round annular pipe coverings, the two blades will be bent into half round profiles, as shown generally in Figures 1 and 2. It will be understood that the blades may be formed to more gradual arcs if it is desired to shape material to other configurations, or one blade of the pair may be bent to a different curvature than the other where dissimilar profiles on the inside and outside are required. Where serrated cutting blades are employed, hacksaw blades having 10 to 14 teeth per inch have proved entirely satisfactory, although blades having 6 to 8 teeth per inch appear to be only slightly less efficient. Blades without any serrations at all may also be employed, and we have found that somewhat higher production rates may be secured thereby, presumably because less area is brought into operative contact with the material being shaped. From the foregoing it will be apparent that, even if the teeth of the blades become worn or indeed entirely destroyed during operation, cutting efficiency will not be reduced. One advantage in employing hacksaw blades as cutting elements, however, is that these commercially available items possess sufficient rigidity to hold their shapes well during service. In this connection, a hacksaw blade $1\frac{3}{16}''$ wide x $\frac{3}{32}''$ thick has proved entirely satisfactory in forming the outside surface of covering for 4" nominal diameter pipe, the profile being approximately $7\frac{3}{8}''$ diameter, while the inside surface was formed with a blade $\frac{5}{8}''$ wide x $\frac{3}{32}''$ thick, the inside profile being about $4\frac{3}{8}''$ in diameter.

As shown in Figure 2 it is preferred to mount the inside cutting blade 17 about $\frac{1}{4}''$ in advance of the outside blade so that the cutting effort will not be concentrated in the same plane transverse the block being shaped, but instead will be distributed to some degree along the longitudinal axis.

The leading edge of blade holder 19 is provided with a number of slots for the reception of the ends of blades 17 and 18. Slots 25 are more shallow than slots 26 and are intended for the mounting of the narrower inside cutting blade 17, while three pairs of slots 26 are shown in Figure 3 to permit cutting three different thicknesses of insulation by varying the arc described by outer blade 18. The blades are preferably mounted with their rear edges in contact with the bottoms of the slots to secure additional support from the holder. The blades are provided at their ends with drilled holes for the reception of bolts for assembly with holder 19. As shown in Figure 5, blades 17 are retained in position by securing them to plates 27 securely welded to the inside of the legs of 19, the plates being provided with drilled holes 28 for reception of the retaining bolts. To permit adjustment of the mounting of outer blade 18 as hereinbefore described, angle iron supports 29 are employed, these supports being provided with drilled holes similar to 28 (not shown) for assembling blade 18 therewith, and also with drilled holes for the reception of bolts 30 which engage with tapped holes 31 in the lower leg of holder 19 and secure the supports firmly in the desired position.

Holder 19 is provided with a channel piece 32 on its forward side which is securely welded thereto and serves as a bumper for the lower end of compression return spring 33, while the rear side is strengthened against the impact of the piston of the vibrating mechanism 34 by the interposition of plate 35 securely joined to 19 by welding.

Vibrating mechanism 34 may comprise a commercially available pneumatic vibrator of the type employed for paint chipping or like service, which is secured to the underside of table 10 by bracket 36 retained in place by two or more bolts 37 which engage with blind tapped holes in 10. Operating air is supplied to 34 through hose line 38 connected to a suitable compressor or to the air supply system of a building, or other source. A pneumatic vibrator operating at 1800 cycles per minute on an 80 lbs. air supply, and with a stroke of $\frac{1}{32}''-\frac{1}{16}''$, has proved entirely satisfactory. If desired, an electrical vibrator of similar characteristics may be substituted for the pneumatic type, the electrical device having the advantage that both the frequency and the amplitude of operation may be varied to suit the particular requirements of the material to be processed.

Cutter holder 19 is positively maintained in contact with the reciprocating piston of vibrator 34 by compression spring 33, hereinabove mentioned, that is welded or otherwise secured to plate 39 mounted in freely rotatable relationship on the end of adjusting bolt 40. Bolt 40 is supported by internally threaded angle iron 41 secured to the underside of table 10 by bolt 42. Locknut 43 maintains bolt 40 at any desired compression setting of spring 33 and provides means for compensating for changes in the characteristics of the spring over periods of sustained operation.

Insulation is shaped to specifications with the device of this invention by loading the table above the cutting blades with blocks of the material and starting operation of the vibrator. The stroke of the cutting blades is so short, being of the order of only about $\frac{1}{32}''-\frac{1}{16}''$ as hereinabove described, that practically no cuttings are disseminated into the air and this hazard to operating personnel is completely eliminated. The limited movement of the cutting blades has an additional advantage in that the operator is not endangered by actual contact with the cutting elements, which do not lacerate the hands or fingers unless considerable resistance is opposed to blade movement. With gravity feed, the operator's activity is limited to keeping the upper part of the table loaded with blocks and removing the shaped pieces as they pass the cutting blades and discharge from the lower end. The bulk of the cuttings also escape from the lower end of the table and may be collected in any suitable receptacle located at this point.

In practice, the device of this invention can be employed to shape half round insulation for pipes up to about 8" nominal diameter, which range includes practically all sizes ordinarily required for insulation purposes. For smaller pipe sizes, such as those below about 2" nominal diameter, two pairs of cutting blades are preferably mounted in side-by-side relationship on the same holder, so that two coverings may be shaped simultaneously. In the latter case it will be understood that the vitreous blocks must be sufficiently large so that the near face contacts both sets of blades during feeding. An important advantage of the inventive device is that waste of material can be largely avoided by feeding once-processed material through the machine again, so that additional shapes are formed from the residual pieces which were formerly discarded. Thus, the inner cut outs from 4" half round size insulation shapes may be passed through a single set of 1½" cutting blades to form 1½" half round size shapes, or 12" x 4" x 18" blocks may be inverted and reprocessed where a sufficient thickness of material remains for the formation of one or more pieces of the same size as, or a smaller size than, those formed on the first pass. Economy in the use of material may also be achieved by cementing two or more cut outs together to make up a larger unitary block upon which to operate, providing that the presence of a cemented joint is not objectionable in the shape thereby formed. While the production of half round pipe shapes has been particularly stressed in this description, because large quantities are often employed at any one location, it will be understood that this invention is equally applicable to the formation of a wide variety of arcuate shapes, ranging from the half annular to the most gradual curves, as has been hereinbefore described in connection with the mounting of the cutting blades.

Production rates in terms of half round shapes are substantially greater while conforming to precise standards of accuracy than those which can be obtained with any other devices known to us. Thus, a single two blade cutting device of the invention design supplied with blocks 12" x 4" x 18" in size, with the 4" x 18" face presented to the blades, produced 120 pieces of 4" nominal pipe size covering (4⅜" inside diameter x 7⅜" outside diameter) of 12" length per hour, corresponding to a rate of 60 lineal feet of the complete covering during this period. Similarly, a double cutting device having two pairs of blades mounted in side-by-side relationship produced 174 pieces of 2" nominal pipe size covering (2⅜" inside diameter x 5⅜" outside diameter) of 18" length, corresponding to a rate of 130 lineal feet of complete covering, when supplied with 12" x 3" x 18" blocks with the 3" x 12" face presented to the blades. In both cases the shapes measured well within the 2% tolerance based on the nominal pipe diameter, which is the standard for good practice recognized in the insulation trade.

While we have described our invention with reference to the particular embodiments and modifications illustrated in the accompanying drawings, it will be understood that other variations and modifications will be apparent to persons skilled in the art without departing from the essential principles of the invention, and we do not intend to be limited in the scope and spirit thereof except as set forth specifically in the appended patent claims.

What is claimed is:

1. In the cutting of arcuately shaped sections from a block of material, an apparatus comprising a table supporting said blocks positioned to feed said blocks through the apparatus by force of gravity, a multiplicity of uniformly spaced and arcuately shaped cutting means positioned in the line of flow of said blocks, and means rapidly vibrating said cutting means in a direction toward and away from the blocks of material to be cut.

2. In the cutting and shaping of sections lengthwise from blocks of material, an apparatus comprising a supporting table positioned to feed said blocks of material by gravity into cutting position, means guiding the material against lateral movement, a multiplicity of reciprocable cutting blades bent to predetermined profiles and positioned to cut through the blocks of material in lengthwise direction, to produce sections of predetermined uniform thickness, and means rapidly reciprocating the cutting blades in unison toward and away from the blocks of material as said blocks abut the cutting edges of the blades.

3. In the cutting and shaping of insulation from blocks of expanded vitreous material, an apparatus comprising a gravity feeding table for supporting the blocks, guiding means on the feeding surface of said table to restrain said blocks against lateral movement, a pair of reciprocable cutting blades bent to predetermined profiles and positioned to cut through the blocks of material to produce lengthwise sections of uniform thickness, and means rapidly reciprocating the cutting blades in unison toward and away from the blocks of material as said blocks abut the cutting edges of said blades.

4. The invention of claim 3 in which the supporting table is inclined to a position to produce gravity flow of the blocks of material and maintain said blocks in contact with the lowermost of said guiding means.

5. A cutting device for shaping insulation from blocks of expanded vitreous material comprising means for supporting said blocks, guiding means mounted on the top of said supporting means for restraining said blocks against lateral movement, at least one pair of reciprocable cutting blades bent to the profiles which are desired in the product, each pair of said blades being offset laterally from adjacent pairs so that each of said blades contacts separate and independent portions of said blocks, and means for rapidly reciprocating said cutting blades in unison toward and away from said blocks as said blocks are forced against the cutting edges of said blades.

6. A cutting device for shaping insulation from blocks of expanded vitreous material comprising a table for supporting said blocks, said table being inclined to the horizontal a sufficient extent so that said blocks will feed through the device by the force of gravity, guiding means mounted on the working surface of said table for restraining said blocks against lateral movement, a pair of reciprocable cutting blades bent to the profiles which are desired in the product, clamps secured to the underside of said table, supporting means for said blades including a pair of oppositely disposed straps freely movable in the direction of reciprocation in said clamps, and means for rapidly reciprocating said cutting blades in unison toward and away from said blocks as said blocks abut the cutting edges of said blades.

7. A cutting device according to claim 6 wherein the supporting means for said cutting blades comprises a section of angle iron provided with slots on the leading edge for the reception of the ends of said blades, means secured to said angle iron for retaining said blades within said slots, and a pair of straps secured at opposite corners of the top leg of said angle iron for free movement of said supporting means in the direction of reciprocation.

WALTER A. SAMANS.
WILLIAM B. WEAVER.

REFERENCES CITED

The following references are of record in the file of this patent:

UNITED STATES PATENTS

| Number | Name | Date |
|---|---|---|
| 1,292,494 | Lorenz | Jan. 28, 1919 |
| 1,442,612 | Hargraves | Jan. 16, 1923 |
| 2,035,138 | Maxfield | Mar. 24, 1936 |
| 2,524,489 | Strong | Oct. 3, 1950 |

FOREIGN PATENTS

| Number | Country | Date |
|---|---|---|
| 524,141 | Germany | May 2, 1931 |